US008966570B1

(12) United States Patent
Roth et al.

(10) Patent No.: US 8,966,570 B1
(45) Date of Patent: Feb. 24, 2015

(54) ENTITY TO AUTHORIZE DELEGATION OF PERMISSIONS

(75) Inventors: Gregory B. Roth, Seattle, WA (US);
Nathan R. Fitch, Seattle, WA (US);
Kevin Ross O'Neill, Seattle, WA (US);
Graeme D. Baer, Seattle, WA (US);
Bradley Jeffery Behm, Seattle, WA (US);
Brian Irl Pratt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 197 days.

(21) Appl. No.: 13/427,622

(22) Filed: Mar. 22, 2012

(51) Int. Cl.
*G06F 17/00* (2006.01)
*H04L 29/06* (2006.01)

(52) U.S. Cl.
USPC .............. 726/1; 726/2; 726/4; 726/6; 726/26; 726/27; 726/28; 726/29; 726/30

(58) Field of Classification Search
CPC ...................... H04L 29/06836; H04L 63/0884; H04L 21/00; H04L 63/0807; H04L 9/3213; H04L 12/417; H04L 9/32; G06Q 50/01
See application file for complete search history.

(56) References Cited

U.S. PATENT DOCUMENTS

| 2002/0091745 | A1* | 7/2002 | Ramamurthy et al. | 709/100 |
| 2007/0143860 | A1* | 6/2007 | Hardt | 726/28 |
| 2008/0134311 | A1* | 6/2008 | Medvinsky et al. | 726/7 |
| 2010/0186082 | A1* | 7/2010 | Ladki et al. | 726/19 |
| 2010/0263037 | A1* | 10/2010 | Sirota | 726/8 |
| 2012/0117229 | A1* | 5/2012 | Van Biljon et al. | 709/224 |
| 2013/0072160 | A1* | 3/2013 | Lawson et al. | 455/411 |

OTHER PUBLICATIONS

Xu et al., "A Role-based XACML Administration and Delegation Profile and Its Enforcement Architecture", Nov. 2009, ACM, p. 53-60.*
Squicciarini et al., "A Privacy Preserving Assertion Based Policy Language for Federation Systems", Jun. 2007, ACM,p. 51-60.*
Chadwick, "FileSpace an Alternative to CardSpace that Supports Multiple Token Authorisation and Portability Between Devices", Apr. 2009, ACM, p. 94-102.*
Abe et al., "Implementing Identiy Provider on Mobile Phone", Nov. 2007, ACM, p. 46-52.*
Liu et al. "Service Token for Identity Access Management", 2009, IEEE, p. 34-39.*
(AMC Snapshot).*
(IEEE Snapshot).*
(IEEE Snapshot2).*

* cited by examiner

*Primary Examiner* — Michael Pyzocha
*Assistant Examiner* — Demaris Brown
(74) *Attorney, Agent, or Firm* — Novak Druce Connolly Bove + Quigg LLP

(57) ABSTRACT

Systems and methods are described for delegating permissions to enable account access. The systems utilize a delegation profile that can be created within a secured account of at least one user. The delegation profile includes a name, a validation policy that specifies principals which may be external to the account and which are permitted to assume the delegation profile, and an authorization policy that indicates the permitted actions within the account for those principals which are acting within the delegation profile. Once the delegation profile is created, it can be provided to external principals or services. These external principals or services can use the delegation profile to obtain credentials for performing various actions in the account using the credentials of the delegation profile.

30 Claims, 6 Drawing Sheets

ENTITY TO AUTHORIZE DELEGATION OF PERMISSIONS

BACKGROUND

In recent years, an ever increasing number of applications and services have been made available over networks such as the Internet. Due to this, an increasing number of content and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer of a service provider will typically rent, lease, or otherwise pay for access to resources through the cloud, and thus does not have to purchase and maintain the hardware and/or software to provide access to these resources.

In this context, cloud computing security has become an important issue in securing the resources of the various entities involved. A large number of security concerns are faced by service providers and by their customers. Typically, the service provider wants to ensure that the resource infrastructure is secure and that their customers' services and data are protected. Similarly, the customer of the service provider needs to ensure that the provider has taken the proper security measures to protect their information. Furthermore, in some cases, the customer may wish to delegate or share security privileges between multiple heterogeneous services and resources that reside within the service provider or in external networks. It is thus desirable to enable the customer to achieve such sharing of privileges in a trusted and secure manner.

BRIEF DESCRIPTION OF THE DRAWINGS

Various embodiments in accordance with the present disclosure will be described with reference to the drawings, in which.

DETAILED DESCRIPTION

Figure 1:
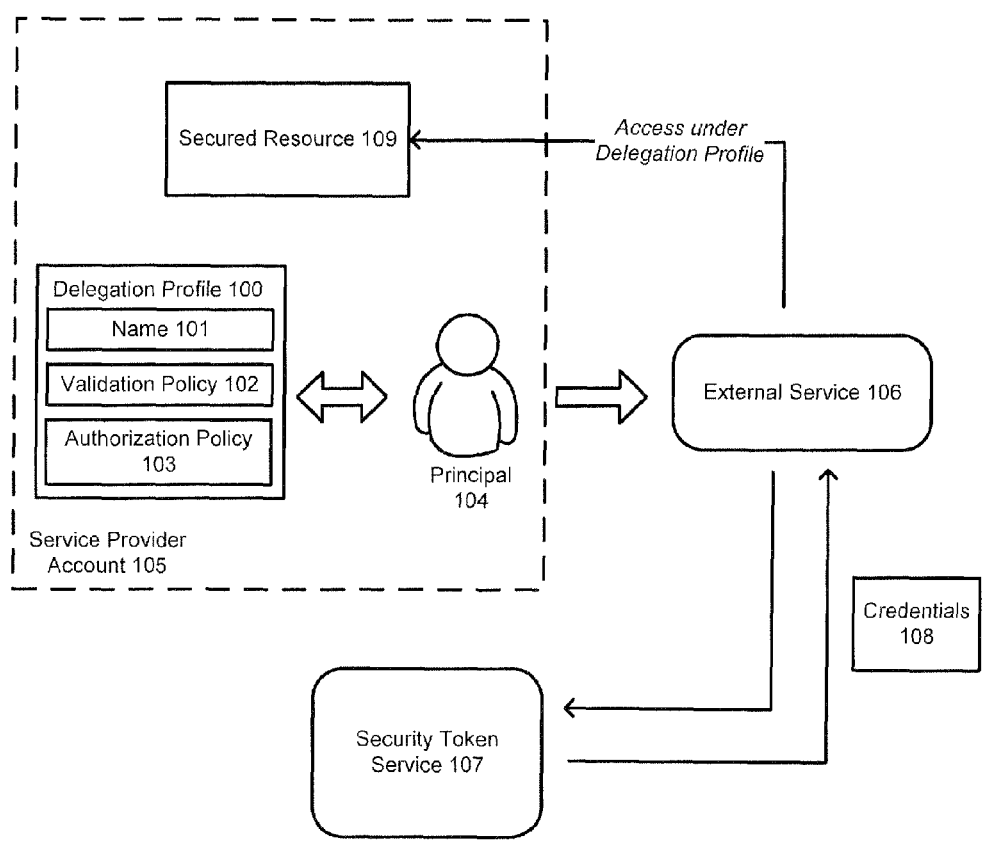
FIG. 1 is a high level illustration of using a delegation profile entity to delegate permissions, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for delegating security rights and privileges between heterogeneous services. In particular, the various embodiments provide approaches for using an entity to authorize delegation of permissions to perform actions in a secured account.

In accordance with various embodiments, to enable this functionality, the system utilizes a delegation profile that can be created within an account of at least one user. In accordance with an embodiment, the delegation pro file includes (a) a name (or other identifier), (b) a validation policy that specifies one or more security principals which may be external to the account and which are permitted to assume the delegation profile, and (c) an authorization policy specifying the permitted actions within the account for principals which are acting within the delegation profile.

Once the delegation profile has been created, permission can be granted to a user of the account to use the delegation profile. Thereafter, the user can use the delegation profile by providing references to the delegation profile to external services or resources within those services. When the external service is provided with a reference to the delegation profile, it can use the reference to obtain a set of credentials for performing certain actions in the account. For example, the external service or other entity can submit a request for credentials to a security token service, where the request includes a reference to the delegation profile. The security token service can verify whether the service is one of the security principals that were specified in the validation policy of the delegation profile. If the service was specified as a security principal, the security token service can provide the external service with a set of credentials. These credentials enable requests to be made within the security context of the delegation profile in the account subject to the permissions that were specified in the authorization policy.

In accordance with various embodiments, the delegation profile is created and used within an account that resides on a service provider. The service provider can provide network-accessible services (e.g. Web Services) and the account may be owned by a customer of the service provider. In various embodiments, the account is associated with a set of resources and principals that can use those resources. The account is secured such that access to the resources of the account is controlled and restricted to authenticated principals. The delegation profile thus encapsulates the grant of permission to a particular entity or set of entities to perform actions on the resources of the account while operating under the credentials of the delegation profile. This grant may span across multiple accounts of the service provider. In addition, the delegation profile may be used in a single service provider or between multiple service providers. The delegation profile can be used to delegate permissions between a plurality of services that are components of a distributed system.

In accordance with an embodiment, someone authorized by the top level identity creates a delegation profile in the account and specifies a name for the profile, a validation policy (granting access to external services or identities), and a set of capabilities for the users (i.e. external services or identities) that will be using the profile.

The external service named in the validation policy can then use the delegation profile to allow entities within the service to act as authorized users of the account subject to the restrictions of the delegation profile. The delegation profile is treated as a resource that is passed to calls that create entities and authorization of the caller is performed by the external service.

FIG. 1 is a high level illustration of using a delegation profile entity to delegate permissions, in accordance with various embodiments. As illustrated, a delegation profile 100 is created in an account 105 provided by a network-accessible services provider. The account 105 is maintained by the service provider on behalf of its clients. The account can include one or more principals 104 and a set of resources (e.g. 109) that the principals can access and use.

The delegation profile 105 is created by an authorized user (e.g. an administrator) to create the delegation profile in the account 105. In accordance with an embodiment, the delegation profile 100 includes a name 101, a validation policy 102 and an authorization policy 103. The name 101 can be a string or any other identifier that is used to refer to the delegation profile. The validation policy 102 specifies which security principals are allowed to assume the delegation profile and perform various actions on resources under the delegation profile. These security principals can be other users or services that reside externally with respect to the account 105. In addition, the authorization policy 103 indicates which specific actions the named security principals are actually allowed to perform (e.g. run instances, read or modify data, access other secured resources in the account etc.).

In accordance with an embodiment, a user 104 of the account 105 is able to provide the delegation profile to an external entity, such as a service 106. For example, the user 104 may provide a reference to the delegation profile to the external service 106. The service 106 can then obtain credentials to act as an authorized user under the account 105 by way of the delegation profile 100. For example, the external service 106 may use the reference to the delegation profile 100 and request the credentials from a security token service 107. The security token service (or other identity management entity) can verify whether the validation policy defined in the delegation profile properly identifies the external service 106 as one of the security principals that is allowed to assume the delegation profile. If the external service 106 is verified, the security token service can issue a set of credentials 108 that can be used by the external service to perform actions on resources of the account 105 subject to the permissions specified in the authorization policy 103.

In this manner, users of the account are able to provide the delegation profile to various external entities (e.g. users, services, applications, etc.) and if those entities have been properly identified as security principals in the validation policy of the delegation profile, then they are able to act in the account. This enables external entities to perform various actions on resources in the account which have been granted to them by the authorization policy, all without the need to make those external entities actual users of the account. This can provide a more efficient control model over the actions and actors that are able to access the resources of the account under the assumption of the delegation profile.

Figure 2:
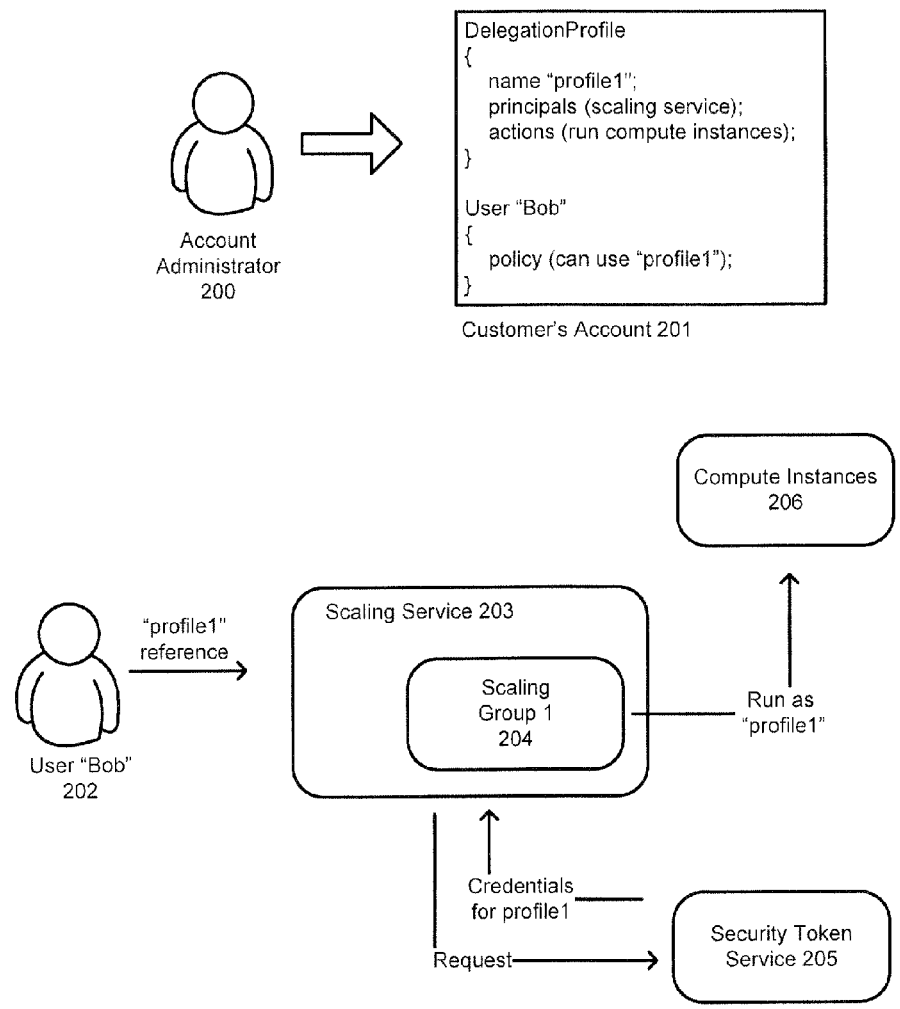
FIG. 2 is an example illustration of using the delegation profile with a customer's account, in accordance with various embodiments.

FIG. 2 is an example illustration of using the delegation profile with a customer's account, in accordance with various embodiments.

As an illustration, an administrator 200 of a customer's account 201 may create a delegation profile named "profile1" with a validation policy that grants access to an automatic scaling service (i.e. security principal) to assume the delegation profile. By way of example, the scaling service may be responsible for adding or removing resources to the customer's account 201 depending on demand for compute or storage capacity. When the customer of a service provider needs more computing resources due to an increase in traffic or workload, the automatic scaling service may automatically add compute instances to meet the traffic demand. Similarly, when some of the customer's leased resources are sitting idle and unused, the scaling service can automatically reduce the number of compute instances allocated to the customer.

In accordance with the illustrated embodiment, the delegation profile further includes an authorization policy that specifies a set of permissions for the scaling service to perform. In this particular example, the specific action that is permitted is to "run compute instances" under the delegation profile in the customer's account. However, in alternative embodiments, the action can be any action that can be performed in connection with the account 201, such as accessing data, modifying resources, executing services and the like.

Once the delegation profile has been created, the administrator may grant the use of the profile to user of the account named "Bob" such as by including a statement "profile: useprofile" under Bob's identity in the account. After the user Bob 202 has been granted the right to use the profile, Bob 202 may invoke the scaling service 203 to create a scaling group "Group 1" 204 (or any other resource modeled within the scaling service), passing in the unique identifier of "profile1" as an argument to the scaling service 203. For example, the scaling group "Group1" 204 may be a resource modeled within the scaling service that is associated with a group of specific computing instances that should be managed (i.e. expanded or shrunk in number) by the scaling service. Another example of a resource modeled within a service may be code running on a computing instance that may need to invoke a resource in the account acting under the guise of the delegation profile.

Upon receiving the request from the user 202, the scaling service 203 could check whether user Bob 202 has permissions to perform the action "profile:useprofile" on "profile1" and create the appropriate group for the user.

Subsequently, when the scaling group 204 needs to take actions on the account 201, the scaling service 203 may create a credential for the scaling group 204 by passing a reference to "profile1" to an identity management service 205. The identity management service can be any security entity that can verify the validation policy and authorization policy of the delegation profile. In accordance with an embodiment, the scaling service 203 would then use the resulting credential to represent the scaling group 204. All subsequent actions taken on the customer's account can be performed by the scaling group "Group1" 204 which is an entity within the customer's account. In some cases, the customer's group may need to have permissions to take all actions within the account that are necessary, like launching compute instances.

Figure 3:
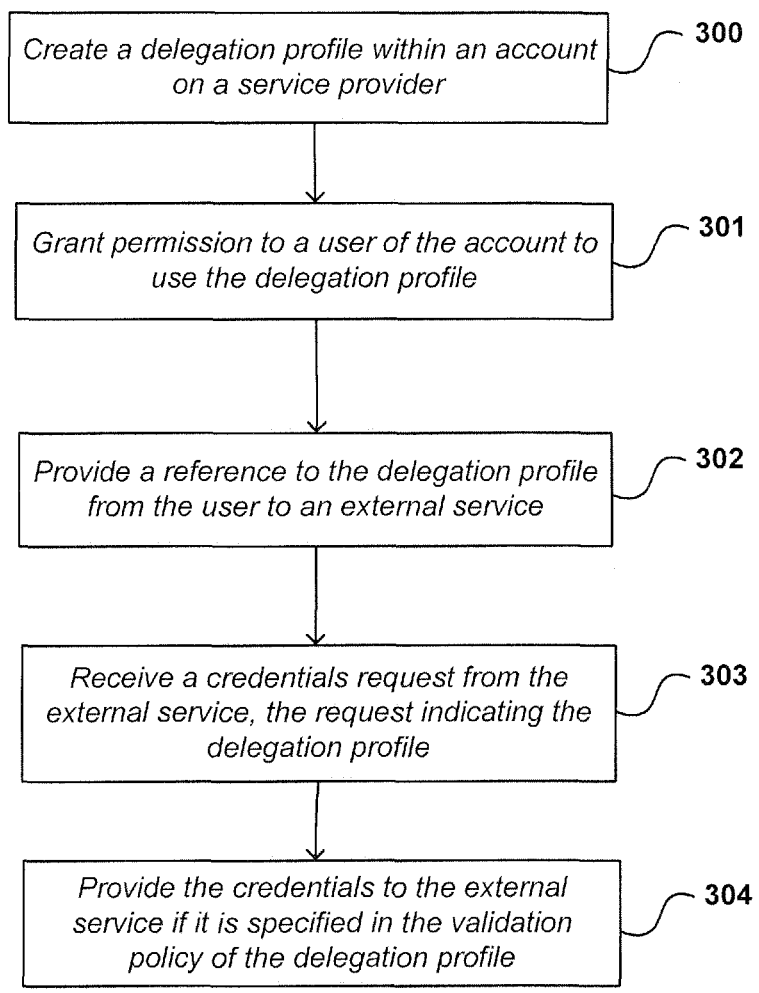
FIG. 3 illustrates an example process for using an entity to delegate permissions, in accordance with various embodiments.

FIG. 3 illustrates an example process for using an entity to delegate permissions, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments.

As shown in operation 300, a delegation profile is created in an account of a service provider. For example, an account administrator that manages a customer's account on a service provider may create the delegation profile. The delegation profile can specify a name, a security principal that will be allowed to assume the delegation profile, and a set of actions that the security principal will be allowed to perform in the account.

In operation 301, an authorized user under the account is granted permission to use the delegation profile. For example, the administrator can enable one or more users of the account to provide the delegation profile to external entities so that they are able to access the account resources.

In operation 302, the authorized user may provide a reference to the delegation profile to an external service. The external service may reside on the service provider but outside of the account in which the delegation profile was created. Alternatively, the external service may reside outside of the service provider itself.

In operation 303, once the external service receives the reference to the delegation profile, it can submit a request for credentials to perform actions in the account. For example, the external service may submit the request to a security token service and the request may indicate the delegation profile.

In operation 304, the set of credentials can be issued to the external service if the external service was verified as having been designated a proper security principal in the validation policy of the delegation profile. These credentials can enable requests to be made within the context of an identity within the account, wherein the permissions granted to the service are based on the capabilities specified in the delegation profile.

Figure 4:
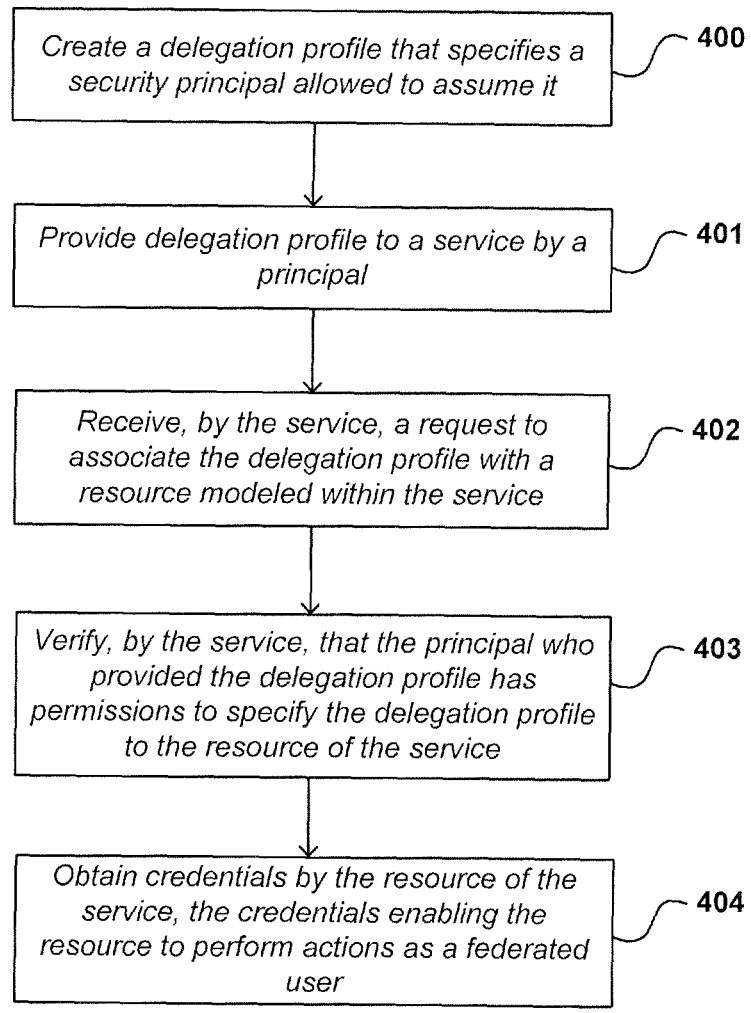
FIG. 4 is an example process for enabling resources modeled within a service to utilize a delegation profile, in accordance with various embodiments.

FIG. 4 is an example process for enabling resources modeled within a service to utilize a delegation profile, in accordance with various embodiments. As shown in operation 400, a delegation profile is created. The delegation profile specifies the one or more principals that are allowed to assume it (act under the profile). In some embodiments, the delegation profile further specifies which actions those principals are allowed to perform while acting under the profile.

In operation 401, the delegation profile is provided to a service, such as by sending to the service a request including a reference to the delegation profile. In operation 402, the service receives the request to associate the delegation profile with a resource that is modeled within the service. For example, the resource may be any component or portion of the service that may need access to the account in which the delegation profile was created.

In operation 403, the service can verify that the principal who provided the delegation profile to it has the permissions to specify (i.e. use) the delegation profile to the resource of the service. This can be performed by checking the permissions or other security information that are associated with the principal on the service itself.

In operation 404, the resource of the service can obtain the credentials that will enable it to perform actions in the account in which the delegation profile was created. For example, the service may obtain the credentials on behalf of the resource modeled within it by invoking a security token service or an identity management service.

Figure 5:
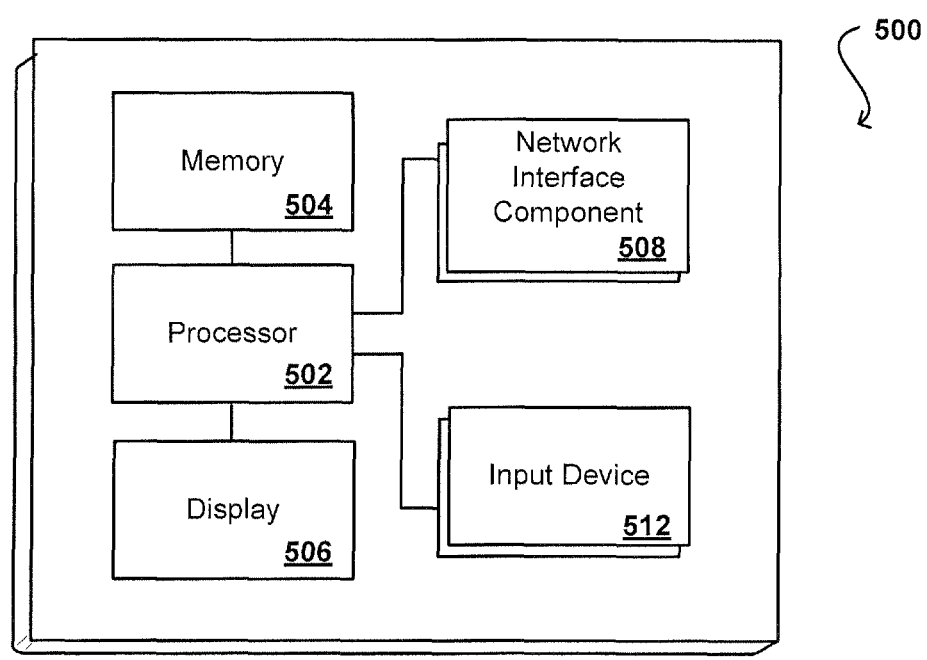
FIG. 5 illustrates a logical arrangement of a set of general components of an example computing device, in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
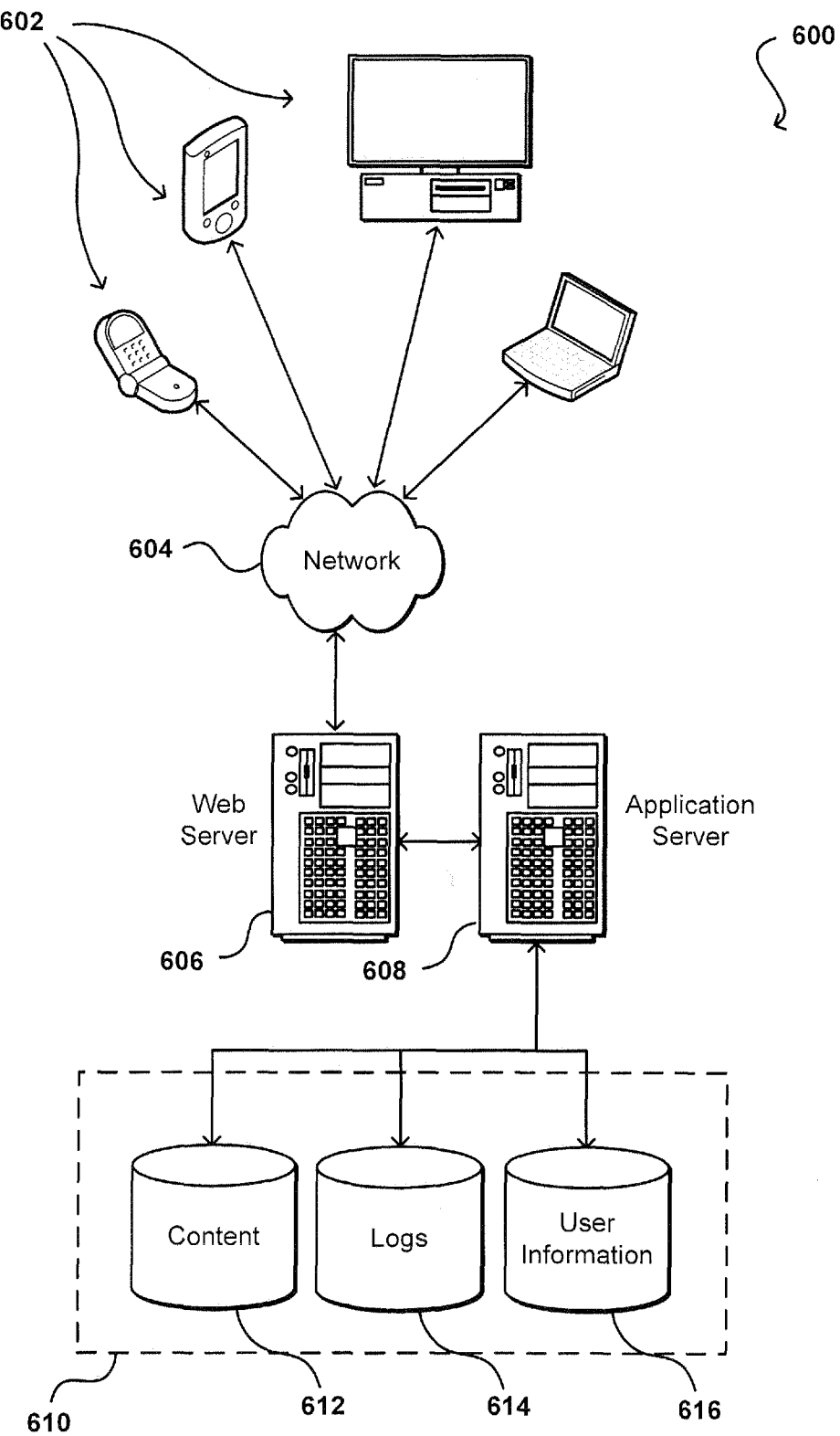
FIG. 6 illustrates an example of an environment 600 for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaining systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for asynchronous permission delegation, said method comprising:
    defining, by a hardware processor, a delegation profile associated with an account, the delegation profile including (a) a validation policy that specifies one or more security principals that are permitted to operate in a security context of the delegation profile under a set of conditions, and (b) an authorization policy specifying permitted actions for the one or more security principals operating in the security context of the delegation profile;
    granting permission to at least one user of the account to use the delegation profile;
    receiving a request for a set of credentials from a service, the request including information for selecting the delegation profile associated with the account;
    providing the request for the set of credentials from the service to a security token service for verification;
    verifying, by the security token service, that the service is authorized in the delegation profile as the one of the one or more security principals that are permitted to operate in the security context of the delegation profile;
    granting the set of credentials to the service if the service is one of the one or more security principals identified by the validation policy of the delegation profile; and
    providing the set of credentials to the service if the service is verified to be one of the one or more security principals identified in the validation policy of the delegation profile as selected based on the information included in the request, the credentials enabling requests to be made in the account within the security context of the delegation profile and subject to the authorization policy of the delegation profile.

2. The method of claim 1, wherein the account resides on a service provider that provides network-accessible services, the account being assigned to at least one customer of the service provider, the account being associated with a set of resources and a plurality of principals that use the set of resources.

3. The method of claim 2, wherein the service is one of a plurality of services offered by the service provider.

4. The method of claim 1, wherein the set of credentials is used by the service to make requests in the account in conjunction with a set of additional credentials held by the service.

5. The method of claim 1, wherein the delegation profile further includes an identifier of the principal that is allowed to use the delegation profile; and
    wherein receiving the request for the set of credentials from the service further includes receiving a unique identifier along with the request from the service, and verifying that the unique identifier matches the identifier in the delegation profile.

6. The method of claim 1, further comprising:
    logging the one or more actions that were performed by the service in the account while acting under the delegation profile.

7. A computer implemented method for permission delegation, said method comprising:
    creating, by a hardware processor, a delegation profile in an account, the account being maintained by a service provider that provides network accessible services, the account being associated with a set of resources, the delegation profile identifying (a) one or more security principals that are allowed to operate on the resources in the account and (b) a set of permissions for the one or more security principals;
    receiving, by the service provider, a request from an entity for a set of credentials that allows access to the account, the request including information for selecting the delegation profile in the account;
    verifying whether the entity has been identified in the delegation profile as one of the one or more security principals that are authorized to act under the delegation profile; and
    issuing the set of credentials to the entity if the entity is verified to be one of the one or more security principals identified in the delegation profile selected in the account based on the information included in the request, the set of credentials enabling the entity to act on the resources in the account as the one or more security principals identified by the delegation profile subject to the permissions specified in the delegation profile.

8. The method of claim 7, wherein the entity is at least one user of a second account on the service provider.

9. The method of claim 7, wherein the entity is at least one service that resides externally with respect to the account.

10. The method of claim 7, wherein creating the delegation profile on the account further includes:
    granting explicit permission to one or more users of the account, the permission allowing the one or more users to provide references to the delegation profile to external entities that reside outside of the account.

11. The method of claim 7, wherein the authorized user of the account is associated with a unique identifier on the entity, and wherein the entity provides the unique identifier along with the reference to the delegation profile upon submitting the request for the credentials.

12. The method of claim 7, wherein the service provider offers an interface to create the delegation profile based on input received from an administrator associated with the account.

13. The method of claim 12, wherein the permissions of the delegation profile are restricted to a scope that is less than or equal to the permissions of a caller invoking the interface.

14. The method of claim 7, wherein the entity is a service and wherein the one or more security principals identified in the delegation profile are associated with resources that are modeled within the service.

15. The method of claim 14, wherein the resources are able to perform one or more actions within the account, the actions being subject to the permissions identified in the delegation profile.

16. The method of claim 14, wherein the service receives a request to associate the delegation profile with a resource modeled within the service, the request received from a user of the account.

17. The method of claim 16 wherein upon receiving the request, the service verifies that the user has permissions to specify the delegation profile to the service.

18. The method of claim 14 wherein the service is operated by a second service provider, the second service provider being separate and independent from the service provider.

19. A computing system including at least one storage memory containing instructions and one or more hardware processors that execute the instructions to perform a set of operations comprising:
    defining a delegation profile associated with an account on a service provider, the delegation profile including (a) a validation policy that identifies one or more security principals that are allowed to operate on resources of the account and (b) an authorization policy that identifies a set of permissions for the one or more security principals;
    receiving, from an external entity, a request for a set of credentials that allow access to the account, the request including information for selecting the delegation profile associated with the account;
    verifying whether the external entity has been identified in the delegation profile as one of the one or more security principals that are authorized to act under the delegation profile; and
    issuing the set of credentials to the external entity if the external entity is verified to be one of the one or more security principals identified in the delegation profile as selected based on the information included in the request, the set of credentials enabling the external entity to act on the resources in the account as the one or more security principals identified by the delegation profile subject to the permissions specified in the authorization policy of the delegation profile.

20. The computing system of claim 19, wherein the external entity is at least one user of a second account on the service provider.

21. The computing system of claim 19, wherein the external entity is at least one service that resides externally with respect to the account.

22. The computing system of claim 19, wherein defining the delegation profile on the account further includes:
    granting explicit permission to one or more users of the account, allowing the one or more users to provide references to the delegation profile to external entities that reside outside of the account.

23. The computing system of claim 19, wherein the service provider offers an interface to create the delegation profile based on input received from an administrator associated with the account.

24. The computing system of claim 19, wherein providing access to the entity further includes:
    receiving an assertion of an active identity in the account from the entity and associating requests made by the entity with the active identity in the account.

25. A non-transitory computer readable storage medium storing one or more sequences of instructions executable by one or more processors to perform a set of operations comprising:
    constructing a delegation profile in at least one of a plurality of accounts on a service provider, the delegation profile identifying (a) one or more principals that are allowed to act on resources in the account and (b) a set of permissions for the one or more principals;
    receiving a request from an entity for a set of credentials that allows access to the account, the request including information for selecting the delegation profile in at least one of the plurality of accounts;
    verifying whether the entity was identified as one of the one or more principals in the delegation profile selected in at least one of the plurality of accounts based on the information included in the request;
    issuing the set of credentials to the entity if the entity has been verified to have been identified in the delegation profile as the one of the one or more principals; and
    providing access to the entity if the entity is verified to be one of the one or more security principals identified in the delegation profile, the access enabling the entity to act on the resources in the account as the one or more security principals identified by the delegation profile subject to the permissions specified in the delegation profile.

26. The non-transitory computer readable storage medium of claim 25, wherein the entity is at least one user of a second account of the plurality of accounts on the service provider.

27. The non-transitory computer readable storage medium of claim 25, wherein the entity is at least one service that resides externally with respect to the account.

28. The non-transitory computer readable storage medium of claim 25, wherein an authorized user of the account is associated with a unique identifier on the entity, and wherein the entity provides the unique identifier along with the reference to the delegation profile upon submitting the request for the credentials.

29. The non-transitory computer readable storage medium of claim 25, wherein the service provider offers an interface to create the delegation profile based on input received from an administrator associated with the account.

30. The non-transitory computer readable storage medium of claim 29, wherein the permissions of the delegation profile are restricted to a scope that is less than or equal to the permissions of a caller invoking the interface.

* * * * *